3,317,448
BACTERIA-RESISTANT LATICES CONTAINING
α,α'-AZOBIS(CHLOROFORMAMIDINE)
Hershel B. Prindle and Thomas H. Chandler, Lake Jackson Tex., assignors to The Dow Chemical Company, Midland, Mich., a corporation of Delaware
No Drawing. Filed Apr. 1, 1963, Ser. No. 269,742
4 Claims. (Cl. 260—29.6)

This invention relates to bacteria-resistant latexes. More specifically, it relates to latexes containing α,α'-azobis(chloroformamidine), which latexes are highly resistant to bacteria and, in particular, the bacteria strain *Pseudomonas fluorescens*.

Many compounds have been tried as preservatives for latexes and many of these compounds have proven to be effective to some degree. For example, one such compound, formaldehyde, proved to be an excellent preservative, but had the major disadvantage of disappearing from the latex system, to which it had been added, in from two to three weeks and the system thus contained no bactericide. Nitropropanediol was intially very effective, but as in the general case, bacteria quickly built up an immunity to it. The organo mercural compounds suffered the same fate as the nitropropanediol. Thus, a real problem is ever present in the latex art and, besides the requirements of being a bactericide, the preservative compound must not have any detrimental effects on the latex formulations. That is, in latex formulations to which a bactericide is added, the bactericide must not degrade the properties of heat, light, mechanical and salt stabilities of the latexes.

It is an object of the present invention to provide bacteria-resistant latexes.

Another object is to provide latexes which are highly resistant to the bacterial strain *Pseudomonas fluorescens*.

And still another object is to provide latexes which are highly resistant to bacteria and yet which still retain excellent heat, light, mechanical and salt stability. Other objects will appear hereinafter.

These objects are accomplished by preparing aqueous dispersions of various organic polymeric latexes containing from about 10 to about 200 parts per million (p.p.m.) of α,α'-azobis(chloroformamidine), hereinafter called azochloramid, preferably from about 40 to about 100 p.p.m., and most preferably from about 30 to 50 p.p.m. While the range from about 10 to less than 30 p.p.m., function to prevent bacteria growth and will render a latex composition bacteria resistant, it does not cause the latex composition to be permanently bacteria resistant as with the range from 30 p.p.m. and higher. It is surprising that, even when such a small amount of azochloramid as the 30 to 50 p.p.m. range is used, bacteria destruction is complete and permanent and the desired properties of the latexes are not hindered. When the azochloramid is present in concentrations below 10 p.p.m., the bactericidal effect is greatly reduced and not lasting. Ranges much greater than 100 p.p.m. are not detrimental to the bactericidal effect but the properties of the latexes are generally affected. For example, concentrations in the order of 200 p.p.m. cause yellowing of the latexes. However, this yellowing, within reason, does not effect colored latexes, i.e. where a white latex is colored red, blue, etc.

It is known to the art that pH is an important factor in latex formulations and herein consideration must be given thereto. Latexes of the present invention containing azochloramid are preferably formulated such that the pH is in the range of from about 7.0 to about 8.8. However, satisfactory formulations have been achieved with the pH as high as 10. Those skilled in the latex art will recognize the above pH range as being the range wherein bacteria usually grow since strong acid formulations and likewise strong basic formulations retard bacteria growth.

It is surprising that azochloramid, which can be represented by the formula

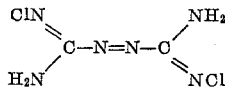

is stable enough in the formulations of the present invention to permit its use. Most compounds of this class in solution, even when protected from light, are relatively unstable. Representative compounds exhibiting this instability include dichlorourea, N-chloroacetanilide and the N-chlorophenylguanidines whose hydrolysis reaction has a tendency to proceed with explosive violence. Further, azochloroamid is the only compound of this class which functions within the scope of the present invention.

A further indication of the extraordinary stability of the azochloroamid in the latexes of the present invention is shown by the fact that latexes having a pH in the preferred range and with azochloramid therein, retained their bacteria resistance even after heating at 60° C. for 60 hours. If the pH is raised to greater than 8.8 up to about 10, higher temperatures and longer time periods may be used on the latexes without destroying the bactericidal effect.

Azochloramid can be prepared by the careful chlorination of azodicarbonamidine

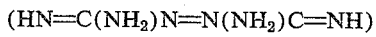

or hydrazodicarbonamidine

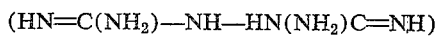

salts with hypochlorites or chlorine gas. The preparation of azochloramid was published by F. C. Schmelkes and H. C. Marks in the Journal of the American Chemical Society, vol. 56, 1610—1612 (1934). Further, the methods for preparing azodicarbonamidine and hydrazodicarbonamidine, respectively, were published by Thiele in Annalen der Chemie, vol. 270, 39, 42 (1892) and ibid., vol. 273, 140 (1893).

Organic, polymeric latexes applicable in this invention can be prepared by employing known methods for polymerizing the monomer. The monomer in solution, emulsion or suspension can be polymerized by the aid of heat and/or light in the presence or absence of polymerization catalyst at subatmospheric, atmospheric or superatmospheric pressure. Instead of using all liquid monomeric material, it is possible to start with partially polymerized materials or with monomers and partially polymerized materials. Another method of producing these polymeric latexes is to mix the monomer with a polymer and bring about the further polymerization of the entire mass by the application of heat and/or light in the presence or absence of polymerization catalyst at subatmospheric, atmospheric or superatmospheric pressure. Nevertheless, the organic, polymeric latexes of use in the present invention are best prepared by employing emulsion methods for polymerizing the monomer or monomer mixture.

The organic, polymeric or coplymeric component of the polymeric latexes of the invention may be obtained from polymerizable, olefinic compounds, such as (I) $C_1$–$C_{18}$ primary and secondary alkyl esters of acrylic acid including methyl acrylate, ethyl acrylate, propyl- and isopropyl acrylates, butyl-, isobutyl- and sec.-butyl acrylates, amyl- and isoamyl acrylates, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate; (II) $C_1$–$C_{18}$ primary and secondary alkyl esters of methacrylic acid, such as methyl-, ethyl-, propyl-, isopropyl-, butyl-, isobutyl- and sec.-butyl methacrylates, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate; (III) monoethylenically unsaturated monocarboxylic acids, such acrylic acid, methacrylic acid and the like; (I) monoethylenically unsaturated dicarboxylic acids, such as maleic acid, fumaric acid, crotonic acid and the like; (V) monoethylenically unsaturated nitriles, such as acrylonitrile, methacrylonitrile, etc.; (VI) various monoalkenyl aromatic hydrocarbons of the benzene series characterized by the general formula

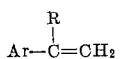

wherein Ar, selected independently, represents an aromatic hydrocarbon and a nuclear halohydrocarbon radical and R is a substituent selected from the group consisting of hydrogen, a $C_1$–$C_4$ alkyl radical, and a halogen radical having an atomic number of from 17 to 35. Such monomers include styrene, α-methylstyrene, o-methylstyrene, p-methylstyrene, ar-methylstyrene, ar-ethylstyrene, propylstyrenes, butylstyrenes, ar-chlorostyrene, ar-bromostyrene and the like. Also, contemplated are (VII) open-chain aliphatic conjugated dienes having from 4 to 9 carbon atoms, such as butadiene, isoprene and the like, as well as (VIII) vinyl chloride; and (IX) vinylidene chloride.

In further illustration of latexes which can be made bacteria resistant by the presence therein of a suitable amount of azochloramid, there are those latexes known to the art and which are generally classified as (A) acrylic latexes, and (B) styrene-butadiene latexes. Specific examples of acrylic latexes which benefit appreciably by this invention include (1) a terpolymer latex composed of about 60 weight percent of copolymerized butyl acrylate, about 37 weight percent of copolymerized acrylonitrile and about 4 weight percent of copolymerized methacrylic acid; (2) a copolymer latex composed of about 41 weight percent of copolymerized ethyl acrylate and about 29 weight percent of copolymerized methyl methacrylate; (3) a quaternary copolymer latex composed of about 50 weight percent of copolymerized styrene, about 40 weight percent of coplymerized 2-ethylhexyl acrylate, about 7.0 weight percent of copolymerized acrylonitrile and about 3.0 weight percent of copolymerized acrylic acid; and particularly (4) a ternary copolymer composed of about 66 weight percent of copolymerized ethyl acrylate, about 32.5 weight percent of copolymerized methyl methacrylate and about 1.5 weight percent of copolymerized methacrylic acid; and (5) a quaternary copolymer latex composed of about 55.7 weight percent of copolymerized ethyl acrylate, about 33.8 weight percent of copolymerized methyl methacrylate, about 5.7 weight percent of copolymerized butyl acrylate and about 4.8 weight percent of copolymerized methacrylic acid. Particular examples of styrene-butadiene latexes include (1) a copolymer latex composed of about 67 weight percent of copolymerized styrene and about 33 weight percent of copolymerized butadiene, and (2) a quaternary copolymer latex composed of about 53 weight percent of copolymerized styrene, about 43 weight percent of copolymerized butadiene, about 3 weight percent of copolymerized fumaric acid and about 1 weight percent of copolymerized acrylic acid.

In addition to the specific organic, polymeric latexes set forth above, various stable, compatible mixtures of the above polymeric latexes may, likewise, benefit by having present therein the effective azobischloramid bactericide of the present invention.

Since certain changes may be made in the above polymerizable monomeric components, and since different embodiments of the invention could be made without departing from the scope thereof, it is intended that all matter contained in the above description shall be interpreted as illustrative only and not in a limiting sense.

Thus, the term "monomer" implies a single monomer or a mixture of two or more monomers and the term "polymer" implies a homopolymer or a copolymer of two or more monomers.

An emulsifier is generally employed in these known emulsion polymerization practices preferably in an amount in the range of from about 0.1 to 0.5 percent based on monomer weight and may be of the anionic, cationic or nonionic type. While it is desirable to have an anionic emulsifier, it is not detrimental if a small amount, i.e. up to 10 percent, of a nonionic emulsifier is present or added after polymerization is complete. Representative compounds of the anionic type include aryl sulfonates, alkali metal aklyl sulfates, alkyl naphthalene sulfonate, n-octadecyldisodium sulfosuccinate, etc. When greater than about 0.5 percent of the emulsifier is employed, there is usually no proportional increase in benefits and the resulting latex may have such a propensity to foam as to detract from its utility as a coating composition. The optimum amount of emulsifier and specific type, other than being anionic, can easily be determined by someone familiar with the field. When less than about 0.1 percent is employed, the stability of the latex, its utility as a coating type polymeric composition, and other properties suffer adversely.

Catalysts are commonly employed in this type of emulsion polymerization and will be known to those familiar with the field. These are generally the water-soluble per-compounds, mixtures of water-soluble and monomer-soluble per-compounds, and other compounds of similar decomposition mechanism. Typical of the useful water-soluble catalysts are hydrogen peroxide, potassium and sodium persulfate and the like. Small amounts of monomer-soluble catalysts, such as the organic peroxides, e.g. benzyl peroxide, may be used in conjunction with the percatalyst. In general, the catalyst is employed in an amount in the range of from about 0.1 to 0.4 percent of the weight of the monomers. If desired, the so-called redox catalytic systems comprising a combination of oxidizing agent and reducing agent may be used.

In accordance with the practice for preparing bacteria-resistant, organic, polymeric latexes of the present invention, from about 10 to about 200 p.p.m., preferably from about 40 to about 100 p.p.m., and most preferably from about 30 to about 50 p.p.m. of a bactericidally-active compound, α,α′-azobis(chloroformamidine), is incorporated by admixing into an aqueous dispersion of at least one organic, polymeric latex, the polymerized monomeric components of said latex being selected from the group of polymerizable ethylenically unsaturated monomers consisting of (I) $C_1$–$C_{18}$ primary and secondary alkyl esters of acrylic acid; (II) $C_1$–$C_{18}$ primary and secondary alkyl esters of methacrylic acid; (III) monoethylenically unsaturated monocarboxylic acids; (IV) monoethylenically unsaturated dicarboxylic acids; (V) monoethylenically unsaturated nitriles; (VI) various monoalkenyl aromatic hydrocarbons of the benzene series represented by the general formula

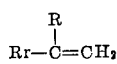

wherein Ar, selected independently, represents an aromatic hydrocarbon radical and a nuclear halohydrocarbon radical and R is selected from the group of substituents consisting of hydrogen, a $C_1$–$C_4$ alkyl radical, and a halogen radical having an atomic number of from 17 to 35 inclusively; (VII) open-chain aliphatic conjugated dienes having from 4 to 9 carbon atoms; (VIII) vinyl chloride; and (IX) vinylidene chloride.

The resultant, bacteria-resistant, polymeric latex dispersion prepared in this manner will contain from about 20 to about 75, and preferably from about 45 to about 55, weight percent of non-volatile solids at 140° C. and will have a bactericide content of from about 10 to about 200 p.p.m. as based on the total weight of non-volatile latex solids.

The following examples are merely illustrative of the practices suitable for preparing known, organic, polymeric latexes and testing the bactericidal activity of the novel α,α'-azobis(chloroformamidine) latex preservative of the present invention and are not be construed as limiting the scope of the invention.

EXAMPLE I

A latex was prepared by maintaining a reaction vessel, containing 110 parts water, 10 parts emulsifier and 0.5 part potassium persulfate and equipped with a means for stirring and temperature control, at 90° C. To this solution was added dropwise over a one-hour time period, a mixture comprising 66 parts of ethyl acrylate, 32.5 parts of methyl methacrylate and 1.5 parts of methacrylic acid. This represents a typical, known to the art, latex preparation.

A sample of the above latex was contaminated with the bacteria strain, *Pseudomonas fluorescens*, the mixture was stirred for one minute, and then allowed to stand for 48 hours. This standing for 48 hours is referred to as incubation time. Streaks of the above incubated latex were placed on an agar plate for 48 hours and this is referred to as plate incubation time. At the end of plate incubation time, the bacteria colonies were counted and the streaks were rated from 1 to 10 with the streaks having no colonies being rated 1. A sample of the above latex, containing no bactericide, had so many colonies of bacteria at the end of plate incubation time that they were beyond counting and the rating was given as 10. The above procedure was followed employing the same latex and various bactericidal compounds as indicated in the following Table I.

TABLE I

| pH | Bactericide, p.p.m. | Inc. Time,[1] hrs. | Plate Inc. Time,[2] hrs. | Rating |
|---|---|---|---|---|
| 7.75 | 0 | 24 | 48 | 10 |
| 7.75 | 500 "Zephiran chloride"[3] | 24 | 48 | 10 |
| 7.75 | 1,000 "Zephiran chloride"[3] | 24 | 48 | 10 |
| 7.75 | 100 "BTC 2125"[4] | 24 | 48 | 10 |
| 7.75 | 1,000 "Roccal"[5] | 24 | 48 | 10 |
| 7.4 | 50 "Elcide"[6] | 24 | 48 | 5 |
| 7.75 | 50 Azochloramid | 24 | 48 | 1 |
| 7.75 | 100 Azochloramid | 24 | 48 | 1 |
| 7.4 | 10 Azochloramid | 24 | 48 | 1 |

[1] Incubation time refers to the time the bactericide remained in the latex before a streak was made.
[2] Plate incubation time refers to the time the streak was on an agar plate before a rating was given.
[3] A mixture of high molecular weight alkyldimethylbenzylammonium chlorides, an antiseptic and a germicide.
[4] A mixture of n-alkyl (C₁₂ to C₁₆) dimethyl benzyl ammonium chlorides and n-alkyl ethylbenzyl ammonium chlorides, a biocidal compound.
[5] A mixture of alkyl dimethyl benzyl ammonium chlorides, a germicide.
[6] Sodium ethyl mercuri thiosalicylate.

EXAMPLE II

Employing the polymerization procedure set forth in Example I, a quaternary copolymer latex was prepared containing about 55.7 weight percent of copolymerized ethyl acrylate, about 33.8 weight percent of copolymerized methyl methacrylate, about 5.7 weight percent of copolymerized butyl acrylate, and about 4.8 weight percent of copolymerized methacrylic acid.

Thereafter, the effectiveness of various bactericidal compounds on curbing the growth of *Pseudomonas fluorescens* bacteria in the above latex was tested and evaluated in accordance with the procedure also explained in Example I. Particulars with regard to the test conditions, bactericides used and the rating results obtained are shown hereinafter in Table II.

TABLE II

| pH | Bactericide, p.p.m. | Inc. Time,[1] hrs. | Plate Inc. Time,[2] hrs. | Rating |
|---|---|---|---|---|
| 7.75 | 500 "Zephiran chloride"[3] | 24 | 48 | 10 |
| 7.75 | 1,000 "Zephiran chloride"[3] | 24 | 48 | 1 |
| 7.75 | 50 Azochloramid | 24 | 48 | 1 |
| 7.75 | 100 Azochloramid | 24 | 48 | 1 |
| 7.75 | 500 "BTC 2125"[4] | 24 | 48 | 10 |
| 7.75 | 1,000 "BTC 2125"[4] | 24 | 48 | 10 |
| 7.75 | 500 "Roccal"[5] | 24 | 48 | 10 |
| 7.75 | 1,000 "Roccal"[5] | 24 | 48 | 10 |
| 7.75 | 500 "Iothan-Q75"[6] | 24 | 48 | 10 |
| 7.75 | 1,000 "Isothan-Q75"[6] | 24 | 48 | 10 |
| 7.75 | Control | 24 | 48 | 10 |

[1] Incubation time refers to the time the bactericide remained in the latex before a streak was made.
[2] Plate incubation time refers to the time the streak was on an agar plate before a rating was given.
[3] A mixture of high molecular weight alkyldimethylbenzylammonium chlorides, an antiseptic and a germicide.
[4] A mixture of n-alkyl (C₁₂ to C₁₆) dimethyl benzyl ammonium chlorides and n-alkyl ethylbenzyl ammonium chlorides, a biocidal compound.
[5] A mixture of alkyl dimethyl benzyl ammonium chlorides, a germicide.
[6] Lauryl isoquinolinium bromide.

EXAMPLE III

*Bacteria-resistant styrene/butadiene latex containing azochloramid*

To 100 grams of an aqueous styrene/butadiene-1,3 copolymer latex dispersion containing about 48 weight percent of polymer solids composed of about 53 weight percent of copolymerized styrene, about 43 weight percent of copolymerized butadiene-1,3, about 3 weight percent of copolymerized fumaric acid and about 1 weight percent of copolymerized acrylic acid was added 1 milligram, a concentration of 10 p.p.m., of α,α'-azobis(chloroformamidine) as a 50 weight percent aqueous solution. After setting for 24 hours, the treated latex was streaked on a nutrient agar plate and the *Pseudomonas fluorescens* bacteria growth observed.

The above-described procedure was repeated using 20 and 30 p.p.m. of α,α'-azobis(chloroformamidine). The test results are tabulated below.

TABLE III

| Azochloramid in p.p.m. | Incubation Time in hrs. | Plate Incubation Time in hrs. | Rating |
|---|---|---|---|
| 0 | 24 | 48 | 10 |
| 10 | 24 | 48 | 1 |
| 20 | 24 | 48 | 1 |
| 30 | 24 | 48 | 1 |

As will be noted from the results of the bacteria incubation tests of Examples I, II and III, azochloramid, the novel bactericide for latexes of the present invention, is an effective bacteria growth-retarding agent of *Pseudomonas fluorescens* bacterial strain at 10 p.p.m. in aqueous dispersions of acrylic latexes having a pH in the range of from 7.1 to 8.8. It is a stable chloramine and it was observed to retain its bactericidal activity in latex after a period of 60 hours in an oven maintained at a temperature of 60° C. In addition, azochloramid has proven to be more stable in latex dispersions at even higher pH levels of from 8 to 10.

As many possible embodiments can be made of this invention without departing from the scope thereof, it is to be understood that all matter herein set forth is to be interpreted as illustrative and not as unduly limiting the invention.

What is claimed is:

1. A bacteria-resistant, water-insoluble, organic, polymeric latex comprised of from about 20 to about 75 weight percent of non-volatile solids composed essentially of from about 10 to about 200 parts per million of α,α'-azobis(chloroformamidine) incorporated in an aqueous dispersion of at least one organic, polymeric latex composed of polymerizable ethylenically unsaturated monomers selected from the group consisting of: (I) $C_1$–$C_{18}$ primary and secondary alkyl esters of acrylic acid; (II) $C_1$–$C_{18}$ primary and secondary alkyl esters of methacrylic acid; (III) monoethylenically unsaturated nitriles; (IV) monoalkenyl aromatic hydrocarbons of the benzene series represented by the general formula

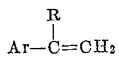

wherein Ar, selected independently, represents an aromatic hydrocarbon radical and a nuclear halohydrocarbon radical and R is selected from the group of substituents consisting of hydrogen, a $C_1$–$C_4$ alkyl radical, and a halogen radical having an atomic number of from 17 to 35 inclusively; (V) open-chain aliphatic conjugated dienes having from 4 to 9 carbon atoms, inclusively; (VI) vinyl chloride; (VII) vinylidene chloride; (VIII) monoethylenically unsaturated monocarboxylic acids; and (IX) monoethylenically unsaturated dicarboxylic acids.

2. A bacteria-resistant, water-insoluble, organic, polymeric latex comprised of from about 45 to 55 weight percent of non-volatile solids composed essentially of from 50 to 100 parts per million of $\alpha,\alpha'$-azobis(chloroformamidine) incorporated in an aqueous dispersion of a ternary copolymer latex composed of about 66 weight percent of copolymerized ethyl acrylate, about 32.5 weight percent of copolymerized methyl methacrylate and about 1.5 weight percent of copolymerized methacrylic acid.

3. A bacteria-resistant, water-insoluble, organic, polymeric latex comprised of from about 45 to 55 weight percent of non-volatile solids composed essentially of from 50 to 100 parts per million of $\alpha,\alpha'$-azobis(chloroformamidine) incorporated in an aqueous dispersion of a quaternary copolymer latex composed of about 55.7 weight percent of copolymerized ethyl acrylate, about 33.8 weight percent of copolymerized methyl methacrylate, about 5.7 weight percent of copolymerized butyl acrylate and about 4.8 weight percent of copolymerized methacrylic acid.

4. A bacteria-resistant, water-insoluble, organic polymeric latex comprised of from about 45 to 55 weight percent of non-volatile solids composed essentially of from 10 to 50 parts per million of $\alpha,\alpha'$-azobis(chloroformamidine) incorporated in an aqueous dispersion of a quaternary copolymer latex composed of about 53 weight percent of copolymerized styrene and about 43 weight percent of copolymerized butadiene-1,3, about 3 weight percent of copolymerized fumaric acid and about 1 weight percent of copolymerized acrylic acid.

References Cited by the Examiner

UNITED STATES PATENTS

| | | | |
|---|---|---|---|
| 1,958,370 | 5/1934 | Schmelkes | 167—22 |
| 2,724,707 | 11/1955 | Brown | 260—29.7 |
| 2,873,263 | 2/1959 | Lal | 167—42 |
| 2,976,204 | 3/1961 | Young et al. | 260—29.7 |

MURRAY TILLMAN, *Primary Examiner.*

J. ZIEGLER, J. T. GOOLKASIAN, *Assistant Examiners.*